US012793069B1

(12) United States Patent
Mondal et al.

(10) Patent No.: US 12,793,069 B1
(45) Date of Patent: Nov. 10, 2026

(54) BIOMETRIC-BASED TRANSACTION VERIFICATION

(71) Applicant: Mastercard International Incorporated, Purchase, NY (US)

(72) Inventors: Shubham Mondal, Bardhaman (IN); Ajay Sinha, Pune (IN); Naveen Kumar Gupta, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 19/305,174

(22) Filed: Aug. 20, 2025

(51) Int. Cl.
*G06Q 20/40* (2012.01)

(52) U.S. Cl.
CPC .............................. *G06Q 20/40145* (2013.01)

(58) Field of Classification Search
CPC ................................................ G06Q 20/40145
USPC ............................................................ 705/71
See application file for complete search history.

(56) References Cited

U.S. PATENT DOCUMENTS 9,600,808 B1 3/2017 Gomez, Sr. et al.
12,198,138 B1 * 1/2025 Trinh ................. G06Q 20/3821
2020/0193410 A1 * 6/2020 Kaja ..................... H04L 9/3231
2021/0105621 A1 * 4/2021 Lerner .................. G06Q 20/32

FOREIGN PATENT DOCUMENTS

CA 3153291 C * 6/2026

OTHER PUBLICATIONS

Barman et al. "Fingerprint Based Symmetric Cryptography", 2014 International Conference on High Performance Computing and Applications (ICHPCA), Dec. 2014, 5 pages, IEEE (Year: 2014).*
Kumar et al. "Cryptographic Key Generation from Fingerprint Biometrics", Jun. 2022, 28 pages, Vel Tech Rangarajan R. Sagunthala R&D Institute of Science and Technology (Year: 2022).*
Suresh et al. "Two-Factor-Based RSA Key Generation from Fingerprint Biometrics and Password for Secure Communication Complex & Intelligent Systems", Aug. 2022 (accessible Feb. 18, 2022), pp. 3247-3281, vol. 8, issue 4 (Year: 2022).*

(Continued)

*Primary Examiner* — James D Nigh
(74) *Attorney, Agent, or Firm* — Talem IP Law, LLP

(57) ABSTRACT

In some aspects, the techniques described herein relate to a payment device that can generate a biometric cryptogram for the transaction, wherein the instructions to generate the biometric cryptogram direct the payment device to: receive biometric data of a user; generate a biometric master key using the biometric data; generate a payment device biometric key using the biometric master key, a personal account number (PAN) of the payment device stored at the secure storage element of the payment device, and a PAN sequence number stored at the secure storage element of the payment device; generate a biometric session key using the payment device biometric key and an application transaction counter (ATC) count; and generate the biometric cryptogram for the transaction using the biometric session key; and provide the biometric cryptogram for the transaction to a point-of-sale (POS) system for authorization of the transaction.

20 Claims, 9 Drawing Sheets

260

(56) References Cited

OTHER PUBLICATIONS

Barman, Subhas, et al., "Fingerprint Based Symmetric Cryptography," 2014 International Conference on High Performance Computing and Applications (ICHPCA), Dec. 2014, 5 pages, IEEE.
Kumar, G. Bhargava, et al., "Cryptographic Key Generation From Fingerprint Biometrics," Jun. 2022, 28 pages, Vel Tech Rangarajan Dr.Sagunthala R&D Institute of Science and Technology.
Mastercard, "Mastercard® Biometric Card," Mastercard. US, 2025, Retrieved: May 29, 2025, 8 pages, Retrieved from: https://www.mastercard.us/en-us/business/overview/safety-and-security/authentication-services/biometrics/biometrics-card.html.
Suresh, K., et al., "Two-Factor-Based RSA Key Generation from Fingerprint Biometrics and Password for Secure Communication," Complex & Intelligent Systems, Aug. 2022 (accessible Feb. 18, 2022), pp. 3247-3261, vol. 8, issue 4.

* cited by examiner

BIOMETRIC-BASED TRANSACTION VERIFICATION

BACKGROUND

A payment network involves a collection of systems that facilitate the communication and transfer of funds. Typically, a cardholder makes a purchase using a payment card (e.g., debit card or credit card) through a point of interaction (POI) device/point-of-sale (POS) terminal associated with a merchant. In some cases, the payment card can generate and provide a cryptogram that can be used for payment during the transaction. The POI/POS connects to the payment network, via an acquirer, to route and communicate transaction messages (e.g., including the cryptogram) across the payment network to an issuer. The issuer can verify the cryptogram and generate return messages based on the verification outcome. Once generated, the pre-authorization response messages and authorization response messages can be routed and communicated back to the merchant.

Conventionally, when a payment card is created and issued (e.g., during card personalization), the payment card is created to store one or more cryptographic keys (e.g., keys derived from an issuer master key) that can be used to generate a cryptogram for payment during a transaction. The issuer stores the issuer master key, which can be used to derive copies of the one or more cryptographic keys during an authorization process. The security and storage of these keys is critical to maintaining security of the sensitive and secure details of the payment card and preventing fraudulent activity (e.g., cloning of the payment card). Therefore, there is a need for more secure ways to create and manage keys that can be used to generate a cryptogram during the transaction process.

BRIEF SUMMARY

Systems and techniques for providing biometric enhanced transaction verification are provided. Advantageously, by generating a biometric cryptogram using a biometric master key created using biometric data of a user, the need for creation and storage of cryptographic keys at the payment device and the issuer (e.g., issuer master key) is eliminated and improved security is possible.

In some aspects, the techniques described herein relate to a payment device, including: a processing system; a communications interface; a storage system including a secure storage element; and instructions stored in the storage system that, when executed by the processing system, direct the payment device to at least: in response to receiving an indicator to initiate payment for a transaction, generate a biometric cryptogram for the transaction, wherein the instructions to generate the biometric cryptogram direct the payment device to: receive biometric data of a user; generate a biometric master key using the biometric data; generate a payment device biometric key using the biometric master key, a personal account number (PAN) of the payment device stored at the secure storage element of the payment device, and a PAN sequence number stored at the secure storage element of the payment device; generate a biometric session key using the payment device biometric key and an application transaction counter (ATC) count; and generate the biometric cryptogram for the transaction using the biometric session key; and provide the biometric cryptogram for the transaction to a point-of-sale (POS) system for authorization of the transaction.

In some aspects, the techniques described herein relate to a method, including: receiving an authorization request for a transaction, wherein the authorization request includes a biometric cryptogram associated with an account of a user and an application transaction counter (ATC) count generated by a payment device of the user; obtaining a biometric master key generated using biometric data of the user; generating a payment device biometric key using the biometric master key, a personal account number (PAN) of the account of the user, and a PAN sequence number (PSN); generating a biometric session key using the payment device biometric key and the ATC count received in the authorization request; generating an issuer-generated biometric cryptogram using the biometric session key; verifying the biometric cryptogram using the issuer-generated biometric cryptogram; and sending an authorization signal for the transaction in response to verifying the biometric cryptogram.

In some aspects, the techniques described herein relate to a computer readable storage medium having instructions stored thereon that when executed by a processing system, direct the processing system to at least: receive an indicator to initiate payment for a transaction; in response to receiving the indicator, generate a biometric cryptogram for the transaction, wherein the instructions to generate the biometric cryptogram for the transaction direct the processing system to: receive biometric data of a user; generate a biometric master key using the biometric data; generate a payment device biometric key using the biometric master key, a personal account number (PAN) of the payment device stored at a secure storage element of the payment device, and a PAN sequence number stored at a secure storage element of the payment device; generate a biometric session key using the payment device biometric key and an application transaction counter (ATC) count; and generate the biometric cryptogram for the transaction using the biometric session key; and provide the biometric cryptogram for the transaction to a point-of-sale (POS) system for authorization of the transaction. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Systems and techniques for providing biometric enhanced transaction verification are provided. Advantageously, by generating a biometric cryptogram using a biometric master key created using biometric data of a user, the need for creation and storage of cryptographic keys at the payment device and the issuer (e.g., issuer master key) is eliminated and improved security is possible.

As described herein, the cryptogram used as part of a conventional transaction flow can be generated using a biometric session key that is derived from a biometric master key created using biometric data of a user received during the transaction. When the biometric cryptogram is received by the issuer for verification, the issuer can generate an issuer-generated biometric cryptogram. The issuer-generated biometric cryptogram is generated using transaction information and a symmetrical biometric session key created using a symmetrical biometric master key, which is also created using biometric data of the user. In cases where the biometric cryptogram received at the issuer matches the issuer-generated biometric cryptogram, the issuer can verify the transaction as legitimate. Advantageously, because the biometric cryptogram will only match the issuer-generated cryptogram where biometric data of the user associated with the payment card is used, the use of the biometric cryptogram increases payment data security and reduces chances for fraudulent charges to occur.

Figure 1:
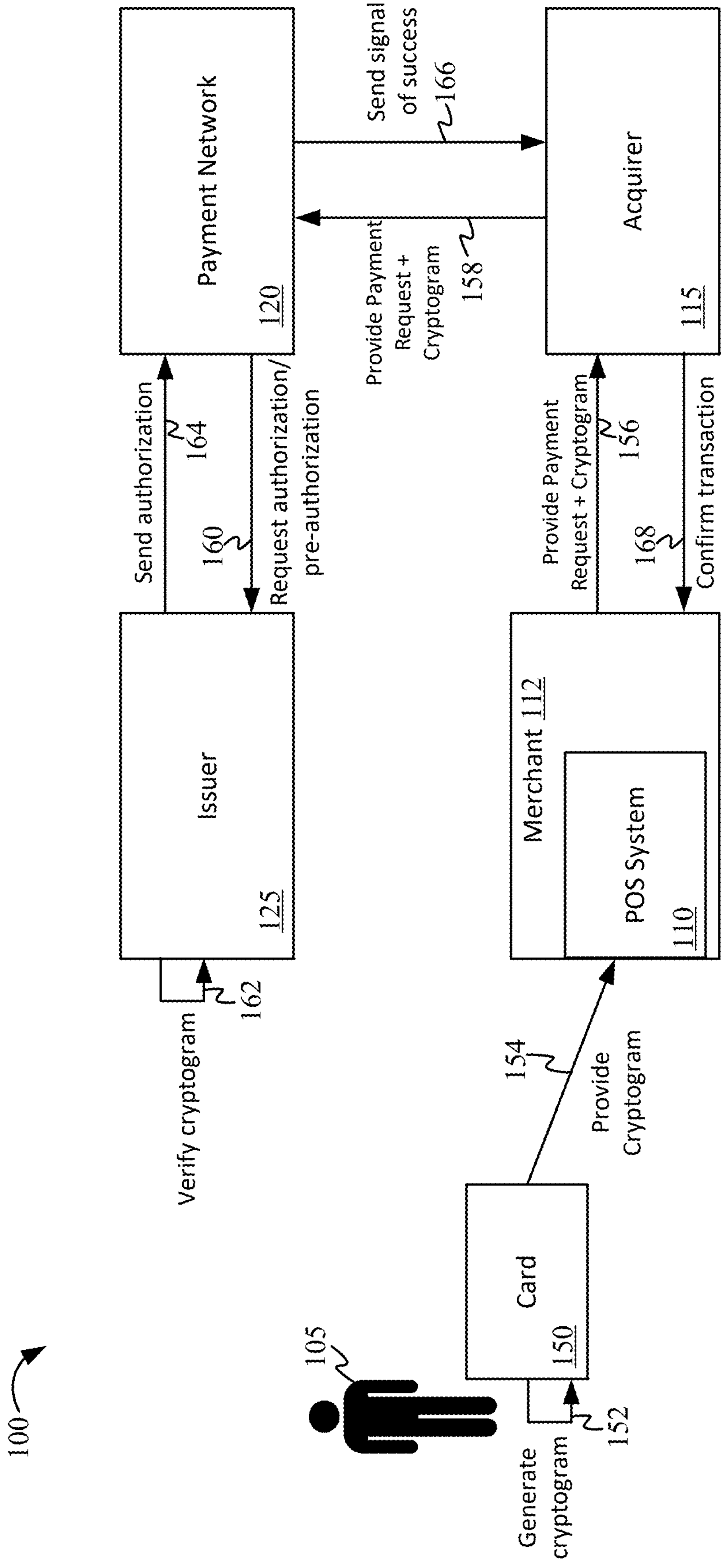
FIG. 1 illustrates an example conventional payment card process flow.

FIG. 1 illustrates an example conventional payment card process flow. Referring to FIG. 1, in conventional payment card processes, there can be communication between a user 105, a merchant 112, an acquirer 115, a payment network 120, and an issuer 125. These communications can include a payment process using a payment card 150. The payment process can include payment card authorization, clearing, and settlement.

The user 105 can be the cardholder or a person authorized to use the account on behalf of the cardholder. The merchant 112 can be a provider of goods or services in exchange for payment. The POS system 110 can be associated with the merchant 112. The POS system 110 can include hardware and software to facilitate the processing of payments and completion of purchases. In some cases, the POS system 110 can be physically present at a sale (e.g., as a point-of-sale terminal) or remote, such as at an online retailer. The acquirer 115 can be a party that receives funds on behalf of the merchant 112 in a payment card transaction. The acquirer 115 can be a bank or other institution associated with the merchant 112. The payment network 120 facilitates transactions between merchants (e.g., merchant 112) and payment card issuers (e.g., issuer 125). Examples of payment network 120 include the Mastercard payment network and the Visa payment network. An issuer 125 can be a bank or other institution at which a user has an account and which issues the payment card to the user.

The conventional payment card process flow 100 can begin with a user 105 presenting a form of payment, for example, payment card 150, to purchase goods or services. In some cases, the form of payment can be a physical card or a virtual card (e.g., hosted on a mobile device, and available in an e-wallet).

The payment card 150 can be embedded with a small computer chip, such as an EMV (Europay, Visa, and Mastercard) chip, that can transmit payment data to the merchant/POS system 110 (e.g., via a card reader) during a transaction (e.g., via dip or tap methods, depending on capabilities of the circuit on the chip).

The payment card 150 can generate (152) a cryptogram for every purchase. The cryptogram can include payment data, terminal data, and/or transaction data (that may be received from the POS system 110). The cryptogram can be a string generated by encrypting the payment data, the terminal information, and/or the transaction data using a session key (i.e., integrated circuit card (ICC) session key).

Generating (152) the cryptogram for every purchase can include generating a session key that is unique to each transaction session for the payment card 150.

During production and personalization of the payment card 150, the payment card 150 is created with a master key (i.e., ICC master key), which can be stored at a secure storage element (e.g., storage device) within the payment card 150. The master key is derived from an issuer master key, where the master key is generated using the issuer master key, along with the payment card's 150 personal account number (PAN) and a PAN sequence number (PSN). The issuer master key is a data encryption standard (DES) key from which the unique payment card specific keys (e.g., payment card master key and unique session keys) are derived.

Because the issuer stores the issuer master key, from which the payment card master key specific to the payment card 150 is derived, both the issuer 125 and the payment card 150 are able to generate symmetrical session keys which can be used to encrypt the cryptogram (e.g., at the payment card 150) and used to regenerate the cryptogram (e.g., the issuer-generated biometric cryptogram at the issuer 125).

Once generated (152), the generated cryptogram can ultimately be used by the issuer 125 for card verification. For example, the issuer 125 can generate a same cryptogram using the stored issuer master key, along with payment card details and transaction details received in the transaction payload (e.g., including the generated cryptogram), to ultimately generate the symmetrical session key that can be used to generate the cryptogram.

The generated cryptogram can be sent to the POS system 110 (e.g., via the card reader), as shown in flow (154).

The POS system 110 can receive the cryptogram from the payment card 150. During communications with the payment card 150 (or other payment device), the POS system 110 can extract payment data about the form of payment, such as payment card number, confirmation code, and expiration date. Information obtained by the POS system 110 can also include transaction information about the purchase, such as location, amount, goods type, and a form of verification provided. Some of this information may be obtained from merchant 112 computing devices.

A payment request, comprising at least the cryptogram and the transaction information, can be provided to an acquirer 115 associated with the merchant 112 as shown at flow (156). The acquirer 115 can, in turn, provide the payment request, including the cryptogram, to the payment network 120 as shown at flow (158).

The payment network 120 can identify an issuing bank, or issuer 125, of the user's 105 form of payment (e.g., associated payment card 150). The transaction can be logged to aid in later processes, such as clearing and settlement. The details of the transaction can also be stored in a transaction information storage, which may be associated with the payment network 120. When the payment network 120 identifies the issuer 125, the payment network 120 can send an authorization request, including the cryptogram and some or all of the information included in the payment request, requesting authorization and/or preauthorization on the form of payment from the issuer 125, as shown at flow (160).

The issuer 125 can run the requested authorization or preauthorization. Authorization can include several steps, such as verifying (162) the cryptogram received in the authorization request. For example, to verify (162) the cryptogram, the issuer 125 may attempt to regenerate a same cryptogram using a key stored by the issuer 125. In some cases, the key stored by the issuer 125 can be the issuer master key. In some cases, the key stored by the issuer 125 can be a copy of the master key specific to the payment card 150 (e.g., ICC master key). The stored key can be used to derive a symmetrical session key (e.g., using information provided in the authorization request).

In some cases, where the issuer 125 is able to regenerate a same cryptogram, the payment card is verified and the issuer 125 may authorize the transaction. However, in some cases, where the issuer 125 is unable to regenerate the same cryptogram using the stored key, the issuer 125 can deny authorization for the transaction.

Additionally, authorization can entail ensuring that a transaction is legitimate using other data included in the authorization message, such as by verifying a means of cardholder verification and/or evaluating transaction location, and/or transaction amount.

In some cases, a cardholder verification method (e.g., PIN) can be implemented by the payment card and the result included as part of the cryptogram or transaction message. Accordingly, in addition to verifying the payment card, the issuer 125 can check that the person using the payment card 150 successfully performed a cardholder verification method. For example, when the user 105 presents the payment card 150 to the merchant/POS system 110, the user 105 may be prompted to enter a PIN or password. As an additional example, a provided form of cardholder verification can be compared against previously given verification (e.g., PIN, biometrics, or signature) to determine if the user is a legitimate user for the form of payment. The result of the cardholder verification method can be provided to the issuer as the additional layer of security.

As another security measure, an issuer 125 can compare the location against typical spending locations to detect fraudulent charges. Finally, an issuer 125 can determine that a purchase is likely to be too high value to be legitimate and flag the purchase as possibly fraudulent.

The authorization can also check to see if the card is currently locked or suspended. Pre-authorization can entail determining that a user has sufficient credit or account balance to make the transaction. A credit card pre-authorization can be a temporary hold on funds equal to the payment that lasts for a period of time (e.g., 5 days). During the temporary hold, the funds cannot be used anywhere else, but the charge may not actually show up on the statement of the form of payment. After one or more of these checks are performed, the issuer 125 can approve the transaction and forward a payment result indicating success or failure back to the payment network 120 as shown at flow (164).

Once the payment result signal is received, the payment network 120 can forward the signal to the acquirer 115 as shown at flow (166). The acquirer can then forward the signal back to the POS system 110 associated with the merchant 112 as shown at step (168) to confirm that the transaction has been authorized. Later on, settlement and clearing can occur. In clearing, the payment and transaction information can be double checked for accuracy. In settlement, the issuer 125 can transfer funds to the payment network 120; the payment network 120 can then transfer the funds to the acquirer 115. Once the acquirer 115 receives the funds, the funds can be made available to the merchant 112.

As reflected in the flow above, the authorization checks performed as part of a payment card process can include two distinct verification processes: cardholder verification and card verification.

Card verification occurs when the issuer 125 verifies whether the payment card (e.g., payment card 150) is a valid payment card issued by the issuer 125. For example, verifying (162) the cryptogram is an example of card verification.

Notably, conventionally, there is no user-specific data included in the standard cryptogram. As such, the issuer 125 may also perform cardholder verification.

Cardholder verification occurs when the issuer 125 verifies whether the person using the payment card 150 is the actual cardholder or not. Typically, cardholder verification can be facilitated by verifying a credential (e.g., PIN, password, biometric credential), etc. Cardholder verification can also be possession based, like use of a one-time-password or token.

Both card verification and cardholder verification provide security benefits and protect against fraud. However, increasingly, many users are opting to use frictionless transaction methods that do not include cardholder verification. For example, tap transactions are increasingly popular given their frictionless nature-streamlining the customer's experience. However, this convenience comes at the cost of the security benefits inherent to cardholder verification.

In cases where no PIN (or other cardholder verification method) is required, if a payment card is stolen, a transaction can easily be made by the thief, because without cardholder verification, there is no cardholder specific data that is included in the transaction flow.

While many transactions made today don't require cardholder verification (e.g., PIN), most transactions still require successful card verification for successful authorization of a transaction. Conventionally, the card verification process does not include/consider any cardholder data. Therefore, authorization processes that include card verification, but not cardholder verification, suffer from security deficiencies that can be exploited by bad actors.

Further, current payment card 150 production and personalization requires creation and storage of the ICC master keys derived from the issuer master key and which are derived from sensitive data that must be stored securely with the issuer and by entities (e.g., personalization bureau) that assist in the production and personalization of the payment cards (e.g., payment card 150). Then, for each payment card 150, a secure ICC master key is created for each card that is created. These ICC master keys are derived from sensitive payment information, including the issuer master key, the particular payment card's PAN and PSN. In cases where the ICC master key is compromised, a payment card associated with the particular ICC master key can be easily cloned. Therefore, the processes around generating and storing ICC master keys need to be managed very carefully by both the issuer 125 and any other entities participating in the production and personalization process.

Through the described systems and methods, biometric data of the cardholder can be used to generate a biometric master key (in place of the issuer master key) at both the payment device (e.g., payment card) and the issuer 125. Advantageously, by using biometric data of the user associated with the payment device to generate a biometric master key at each transaction, improved security is possible where the need for the payment device, the issuer, and other participating entities to store any keys is eliminated and where the biometric master key must be generated using biometric data of the particular user authorized to use a particular payment device.

Figure 2A:
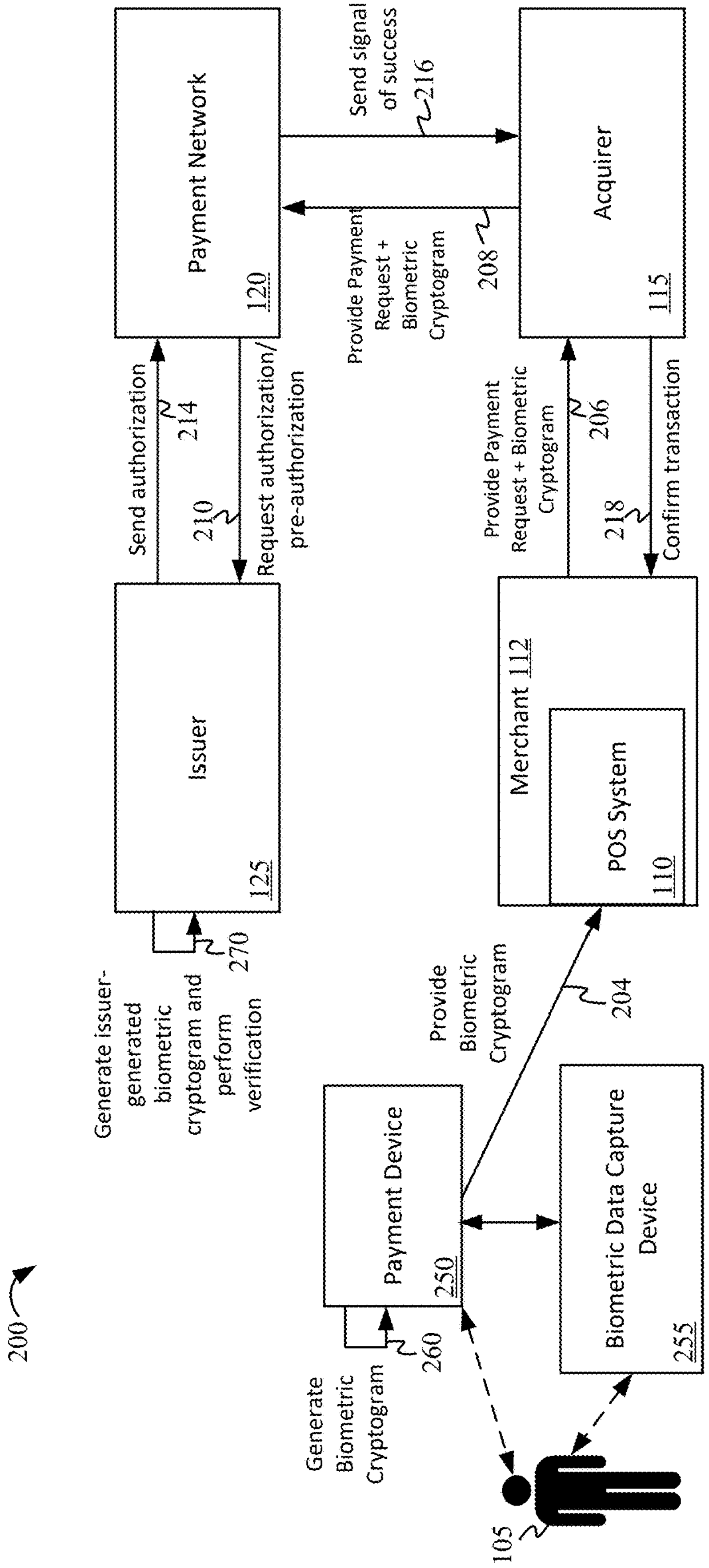
FIG. 2A illustrates an operating environment and example biometric cryptogram transaction process flow using a payment device.

FIG. 2A illustrates an operating environment and example biometric cryptogram transaction process flow using a payment device.

Referring to FIG. 2A, the biometric cryptogram transaction process 200 can begin when the user 105 provides a payment device 250 during a transaction (e.g., to purchase goods and/or services). The payment device 250 can be a physical card or a contactless card (e.g., hosted on a mobile device, and available on an e-wallet). The payment device 250 can be embodied as payment device 700 described with respect to FIG. 6A.

During the transaction, the payment device 250 can generate a biometric cryptogram and provide the biometric cryptogram (along with the payment data, terminal data, and or transaction data) to the POS system 110.

Figure 2B:
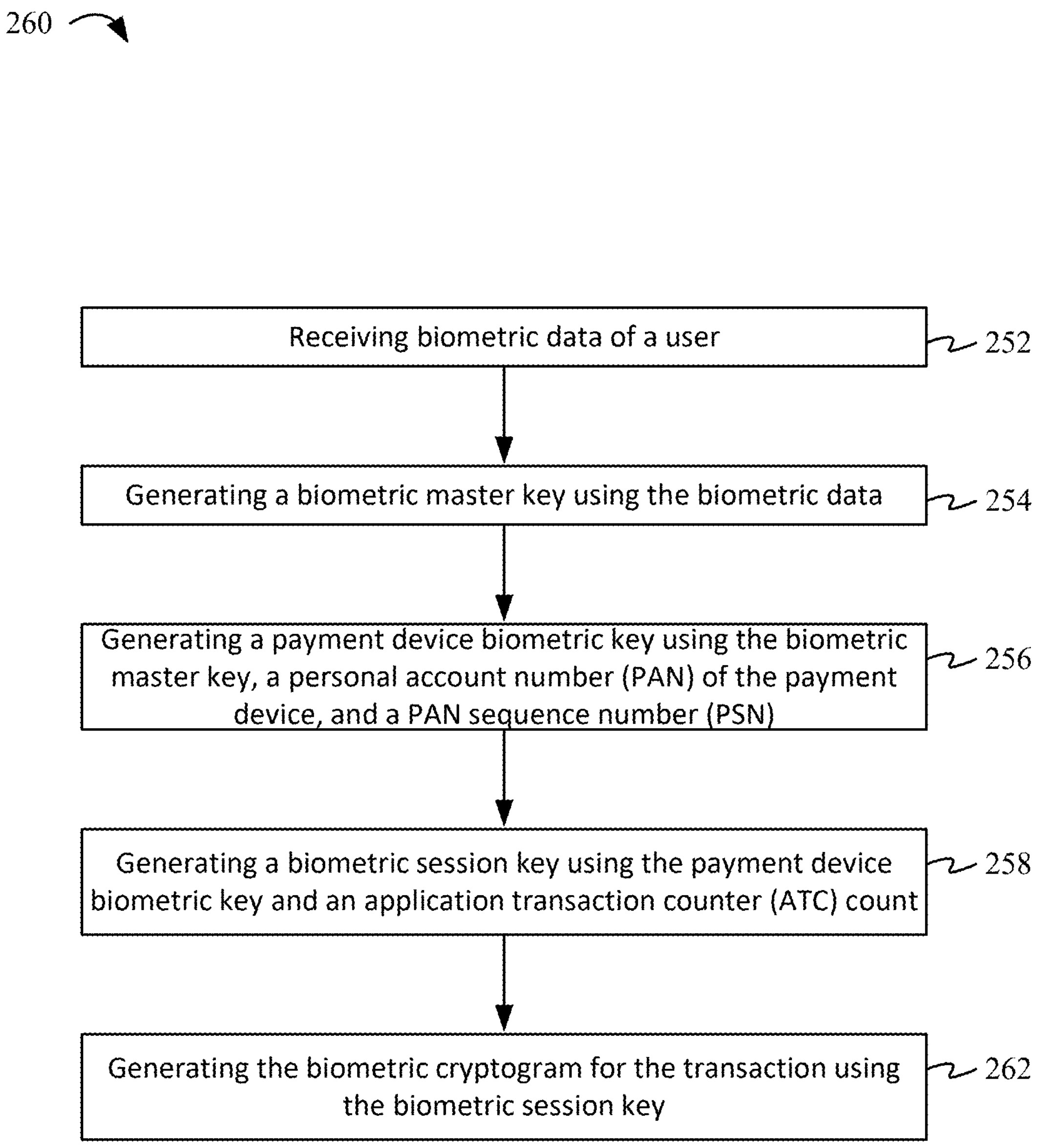
FIG. 2B illustrates an example method for generating a biometric cryptogram.

A biometric cryptogram is a cryptogram that is generated using a biometric session key derived from a biometric master key, where the biometric master key is generated using biometric data. FIG. 2B illustrates an example method for generating a biometric cryptogram. An example implementation of generating a biometric cryptogram from a fingerprint is described with respect to FIG. 3.

Referring to FIGS. 2A-2B, method 260 of FIG. 2B is an example method of generating a biometric cryptogram that can be performed by the payment device 250. In some cases, the method 260 can begin in response to receiving an indicator to initiate payment for a transaction. The indicator can include transaction information and/or terminal information, including, but not limited to, transaction amount, transaction date, transaction type, terminal country code, terminal verification results, transaction currency code, and an unpredictable number. The unpredictable number can be a unique 4-byte field generated by the POS system 110.

Method 260 can begin where the payment device 250 receives (252) biometric data of a user (e.g., via a biometric data capture device 255). In some cases, during the transaction, the payment device 250 and/or the POS system 110 may prompt the user 105 to provide a biometric credential (e.g., face, fingerprint, etc.).

The biometric data of the user 105 can be received through a biometric data capture device 255. In some cases, the biometric data capture device 255 is part of the payment device 250 (e.g., biometric capture interface 720 described with respect to FIG. 6A). For example, the payment device 250 may be a biometrics card configured to receive fingerprint data (e.g., biometric data) from the user 105. In some cases, the payment device 250 can be a mobile device and the biometrics data can be a facial scan, a fingerprint, or other biometric data received via a sensor associated with the mobile device. In some cases, the biometric data capture device 255 can be external to the payment device 250. For example, the biometric data capture device 255 may be part of/coupled to the POS system 110 and the biometric data of the user 105 captured by the biometric data capture device 255 can be provided to the payment device 250 via the POS system 110 (not shown).

Upon receiving (252) the biometric data of the user 105, the payment device 250 can generate (254) a biometric master key using the biometric data of the user 105 received via the biometric data capture device 255. An example process for generating the biometric master key at the payment device is described in more detail with respect to FIG. 3.

Once the biometric master key has been generated (254), the biometric master key can act as the issuer master key used during the conventional cryptogram generation process and can be used to generate a payment device biometric key.

The payment device 250 can generate (256) a payment device biometric key using the biometric master key, a personal account number (PAN) of the payment device 250, and a PAN sequence number (PSN). The PAN and/or the PSN can be stored at a secure storage element of the payment device 250. The resulting payment device biometric key is particular to the user (e.g., by using the biometric master key generated using the user biometric data) as well as the payment device 250 (by integrating the payment device 250 specific PAN and PSN).

Then, the payment device 250 can generate (258) a biometric session key using the payment device biometric key and an application transaction counter (ATC) count. The ATC is a counter maintained by the chip card application (incremented by the payment device 250 chip) that provides a sequential reference to each transaction. The ATC counter is an EMV field and is a two-byte counter incremented at the start of a transaction (e.g., ranging in value from 0x0000 to 0xFFFF). The payment device 250 can generate an ATC count for each transaction.

Then, using the biometric session key, the payment device 250 can generate (262) the biometric cryptogram for the transaction using the biometric session key.

To generate (254) the biometric cryptogram, the payment device 250 uses a symmetric-key algorithm for encryption. A symmetric-key algorithm involves the same cryptographic keys for both the encryption of the plaintext and the decryption of the ciphertext. For example, the symmetric-key algorithm can be the Advanced Encryption Standard (AES). Any symmetric-key algorithm can be used for the encryption. Additional examples of symmetric-key algorithms include, but are not limited to, Twofish, Serpent, Camellia, Salsa20, and Blowfish. In this case, instead of decryption, the issuer 125 will instead generate a symmetrical cryptogram and compare the received biometric cryptogram to the issuer generated cryptogram during validation. As such, the same encryption algorithm must necessarily be used to generate matching biometric cryptograms. In some cases, generating (254) the biometric cryptogram can include encrypting a combination of payment card data, terminal data (e.g., of POS system 110), and/or transaction data.

Then, once the biometric cryptogram has been generated via method (260), the payment device 250 can provide (204) the biometric cryptogram to the POS system 110. In some cases, the payment device 250 can provide additional information, such as the ATC count, to the POS system 110. Once the POS system 110 receives the payment data, terminal data, and/or transaction data and the biometric cryptogram, the POS system 110 can generate a payment request, including the biometric cryptogram, the payment card data, terminal data, and/or transaction data (e.g., merchant location, transaction amount, goods type, etc.). The information included in the payment request can also be referred to as a "transaction payload."

The POS system 110 can provide the payment request, including the biometric cryptogram, to the acquirer 115 associated with merchant 112, as shown in flow (206). The acquirer 115 can, in turn, provide the payment request to the payment network 120, as shown at flow (208). The payment network 120 can identify an issuing bank, or issuer 125, associated with the payment device 250 (e.g., as indicated by payment data included in the payment request). The payment network 120 can send (210) an authorization request (including the biometric cryptogram and some or all of the information included in the payment request) requesting authorization and/or preauthorization on the payment device 250 for the transaction, as shown at flow (210).

Figure 2C:
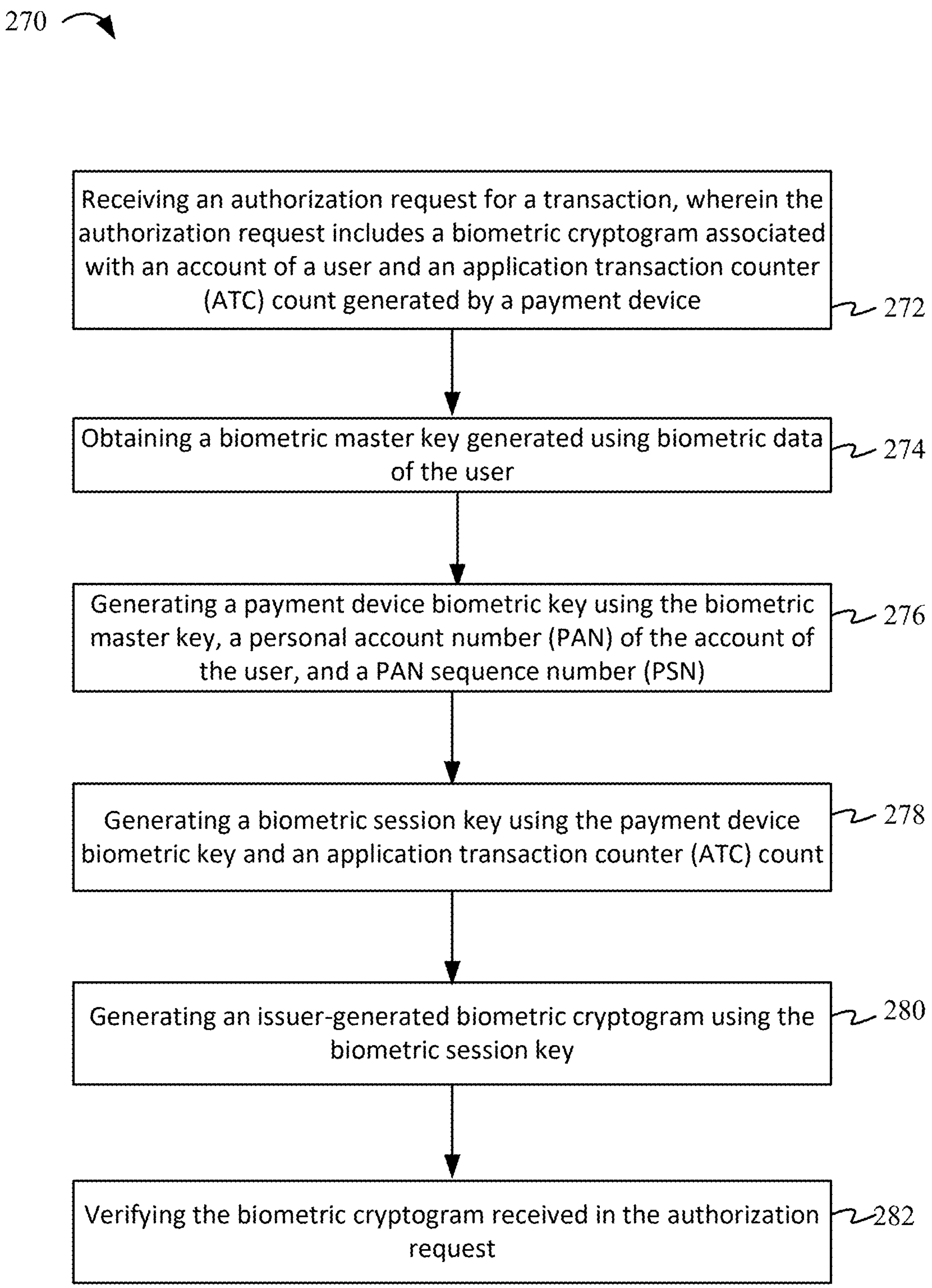
FIG. 2C illustrates an example method for generating an issuer-generated biometric cryptogram.

The issuer 125 can generate an issuer-generated biometric cryptogram and perform verification (e.g., by comparing the issuer-generated biometric cryptogram to the received biometric cryptogram to determine whether to verify or deny the transaction) via method 260 of FIG. 2C. FIG. 2C illustrates an example method for generating an issuer-generated biometric cryptogram and performing verification. An example process of generating an issuer-generated biometric cryptogram from a fingerprint is described with respect to FIG. 4.

Referring to FIGS. 2A and 2C, method 270 of FIG. 2C is an example method of generating an issuer-generated biometric cryptogram for verification. Method 270 can begin when the issuer 125 receives (272) the authorization request for a transaction, wherein the authorization request includes a biometric cryptogram associated with an account of a user and an application transaction counter (ATC) count generated by the payment device 250.

In some cases, the authorization request can be a preauthorization request. In some cases, the issuer 125 can receive the authorization request from a payment network 120. The authorization request can include payment data, terminal data, transaction data, and the biometric cryptogram. The account of the user can be a payment account, where the payment device is linked to the payment account.

In response to receiving (272) the authorization request including the biometric cryptogram, the issuer 125 can generate an issuer-generated biometric cryptogram to verify the biometric cryptogram, for example, by determining whether the received biometric cryptogram and the issuer-generated biometric cryptogram match.

The issuer 125 can obtain (274) a biometric master key generated using biometric data of a user. In some cases, obtaining (274) the biometric master key can include identifying a payment card/payment device associated with the transaction (e.g., using the payment data included in the authorization request). Upon identifying the payment card associated with the transaction, the issuer 125 can retrieve (e.g., from a storage device) biometric data associated with the user associated with the payment card and generate the biometric session key. In some cases, instead of storing the biometric data of a user, the issuer 125 can instead store a gray code sequence generated using the biometric data of the user, as discussed in more detail with respect to FIG. 4. In this case, upon identifying the payment card associated with the transaction, the issuer 125 can retrieve (e.g., from the storage device), the gray code sequence generated using the biometric data of the user and generate the biometric master key.

In some cases, obtaining (274) the biometric session key can include generating the biometric session key using a biometric master key. An example process for generating a biometric session key at an issuer is described in more detail with respect to FIG. 4.

Then, the issuer 125 can generate (276) a payment device biometric key using the biometric master key, a personal account number (PAN) of the payment device, and a PAN sequence number (PSN). In some cases, the issuer 125 stores the PAN of the payment device and a PAN sequence number at a storage resource (not shown).

Then, the issuer 125 can generate (278) a biometric session key using the payment device biometric key and an application transaction counter (ATC) count. In some cases, the ATC count can be included in the authorization request.

Then, the issuer 125 can generate (280) an issuer-generated biometric cryptogram. Generating (280) the issuer-generated biometric cryptogram can include extracting transaction information from the authorization request and encrypting the transaction information using the biometric session key.

To generate (280) the issuer-generated biometric cryptogram, the issuer 125 uses a same symmetric-key algorithm that was used for encryption (e.g., the same algorithm used as part of encryption during method 260). For example, if the AES algorithm is used to encrypt the biometric cryptogram, the AES algorithm is used by the issuer 125 to generate the issuer-generated biometric cryptogram.

Once the issuer-generated biometric cryptogram has generated (280), the issuer can verify (282) the biometric cryptogram received in the authorization request using the issuer generated biometric cryptogram. For example, in some cases, the issuer 125 can compare the biometric cryptogram received in the authorization request to the issuer-generated biometric cryptogram. In cases where the biometric cryptogram received in the authorization request and the issuer-generated biometric cryptogram match, card verification can be approved. In cases where the biometric cryptogram received in the authorization request and the issuer-generated biometric cryptogram do not match, card verification can be denied.

Advantageously, additional security is achieved over traditional methods using an issuer master key since the issuer 125 will only be able to generate a matching issuer-generated biometric cryptogram to the biometric cryptogram generated at the payment device 250 using a biometric master key (and resulting biometric session key) generated using biometric data of the user 105.

For example, if the biometric data used in method (260) belongs to a fraudulent actor instead of the user 105, a fraudulent actor is attempting to make the transaction using the payment device 250, the biometric cryptogram would be generated using a biometric master key generated using biometric data of the fraudulent actor or would entirely lack the appropriate encryption. As such, when the issuer 125 attempts to recreate the biometric cryptogram using biometric data of the user 105 (e.g., by generating the issuer-generated biometric cryptogram), the issuer-generated biometric cryptogram would fail to match the biometric cryptogram because the biometric master keys would not sufficiently match (and thereby not result in the ability to generate identical/matching biometric cryptograms). Therefore, if someone other than the user 105 attempts to conduct a transaction using the payment device 250, the issuer 125 will be able to identify this as fraudulent activity based on the failure to generate an issuer-generated biometric cryptogram that matches the biometric cryptogram received with the authorization request.

So long as the biometric cryptogram generated at the payment device 250 was generated using biometric data of the user 105, the issuer 125 will be able to generate an issuer-generated biometric cryptogram that matches the received biometric cryptogram.

In some cases, where verification is successful and the issuer 125 approves the transaction, the issuer 125 can forward a payment result indicating success back to the payment network 120, as shown at flow (214). In some cases, where verification is unsuccessful and the issuer 125 denies the transaction, the issuer 125 can deny the transaction and forward a payment result indicating a failure back to the payment network 120.

As with the flow described with respect to FIG. 1, once the payment result signal is received, the payment network 120 can forward the signal to the acquirer 115 as shown at flow (216). The acquirer 115 can then forward the signal back to the merchant 112/POS system 110 as shown at step (218) to confirm that the transaction has been authorized. Later on, settlement and clearing can occur.

Figure 3:
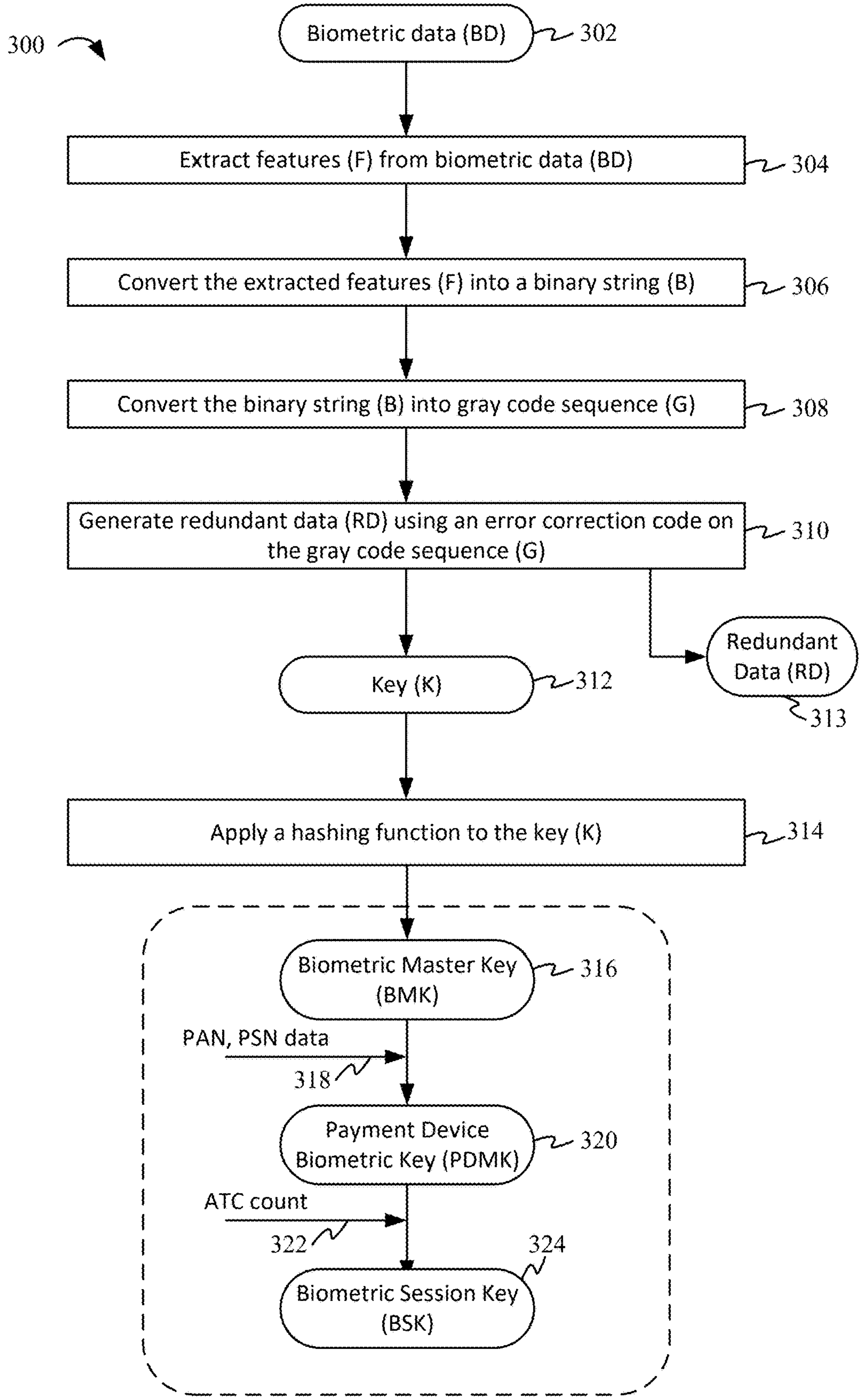
FIG. 3 illustrates an example process for generating a biometric session key using a biometric master key at a payment device.

FIG. 3 illustrates an example process for generating a biometric session key using a biometric master key at a payment device. Referring to FIG. 3, the process 300 can begin in response to receiving biometric data (BD) 302 of a user. The process 300 can be performed at a payment device (e.g., payment device 250 described with respect to FIG. 2A). Examples of biometric data (BD) 302 include, but are not limited to, fingerprint data, facial scan data, and iris data. A specific use case for generating a biometric master key at a payment device using fingerprint data is described with respect to FIG. 6A.

Process 300 can include extracting (304) features (F) from the biometric data (BD) 302. The features (F) can be extracted (304) by a suitable method/algorithm based on the type of biometric data (e.g., fingerprint data, face scan data, etc.).

The extracted features (F) can be converted (306) into a binary string (B). Then, the binary string can be converted (308) into a gray code sequence (G). Gray code, also referred to as reflected binary code (RBC), is an ordering of the binary numeral system such that two successive values differ in only one bit (binary digit). Gray code can be used to result in a minimum bit change for very small changes in input.

The obtained gray code sequence (G) forms key (K) 312. In some cases, the key (K) 312 is a stable key. Additionally, an error correction code can be used on the gray code sequence (G) to generate (310) redundant data (RD) 313.

Examples of the error correction code can include, but are not limited to, Reed-Solomon code and Hadamard code. By applying the error correction code on the gray code sequence (G), redundant data (RD) 313 is generated (310). This redundant data (RD) 313 can be provided to the issuer (e.g., in the transaction payload/payment request) to be used during the key generation on the issuer side to correct erroneous bits in the regenerated gray code sequence generated on the issuer side (e.g., (G')).

Figure 4:
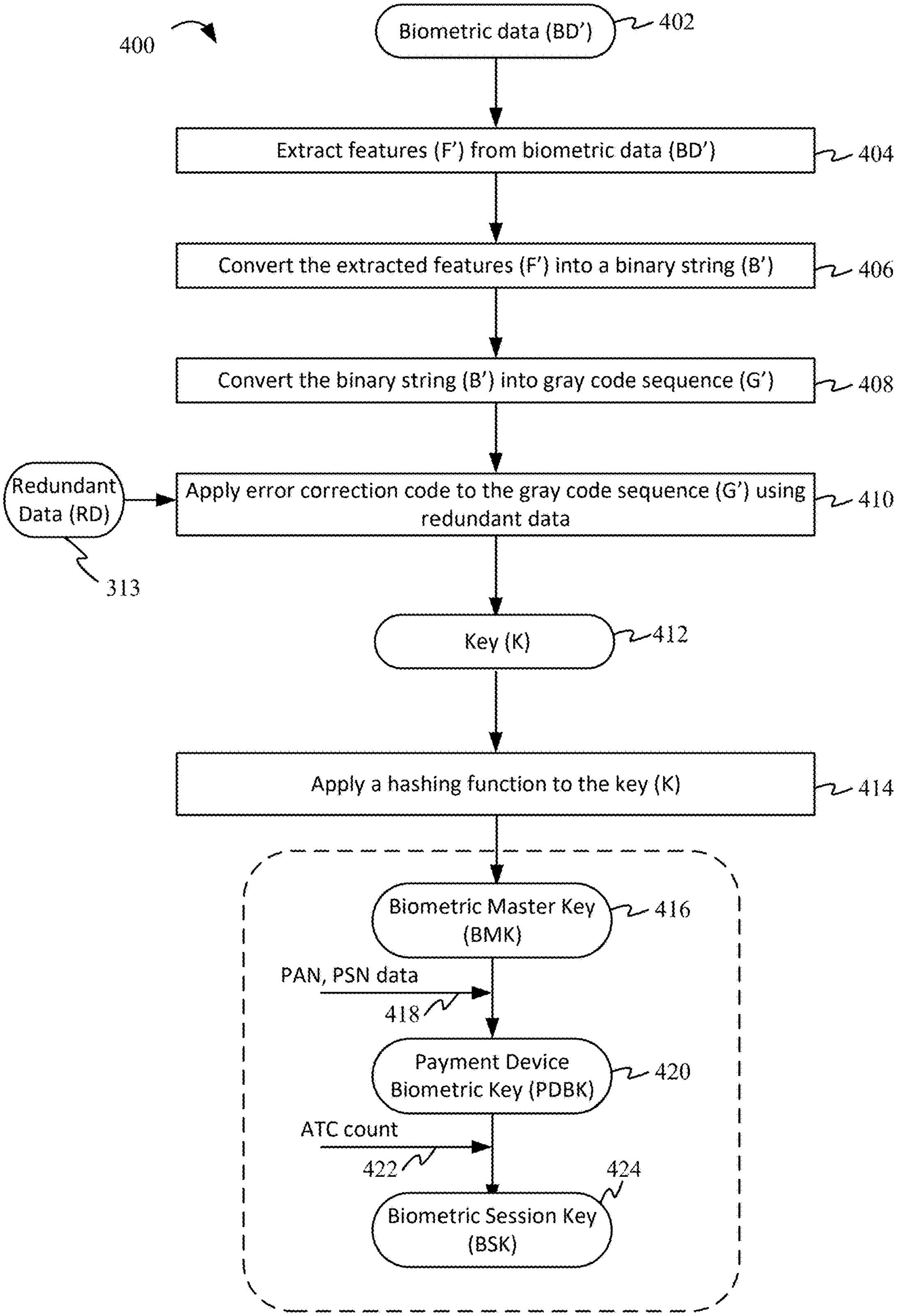
FIG. 4 illustrates an example method for generating a biometric session key using a biometric master key at an issuer.

In order for the issuer to be able to generate a matching issuer-generated biometric cryptogram, the issuer (e.g., issuer 125) must generate an identical key to the biometric master key (BMK) 316 (e.g., biometric master key (BMK) 416 described with respect to FIG. 4). However, the biometric data (BD) 302 used by the payment device 250 to create key (K) 312, and ultimately biometric master key (BMK) 316, may have slight variations from the biometric data used by the issuer (e.g., biometric data (BD') 402 described with respect to FIG. 4). For example, a fingerprint scan image received at the payment device 250 and a fingerprint scan image for the same finger received at the issuer may not be exactly the same.

Therefore, when the process to generate the issuer-generated biometric cryptogram is performed at the issuer, a slightly different gray code sequence (e.g., gray code sequence (G')) is created. Therefore, because the issuer will need an identical biometric master key (BMK) 316, an error correction code can be used during both the process performed to generate the biometric cryptogram at the payment device 250 and during generation of the issuer-generated biometric cryptogram at the issuer.

Once the key (K) 312 is generated, a hashing function can be applied (314) to the key (K) 312 to create the biometric master key (BMK) 316. The hashing function can be applied to convert the key (K) 312 to a fixed length. The hashing function can be chosen based on the key size requirement for the symmetric-key algorithm to be used to encrypt the standard cryptogram (e.g., using AES algorithm) because various cryptographic algorithms can have different key size requirements. Examples of the hashing function can include the SHA-256 algorithm.

The biometric master key (BMK) 316 can act as the issuer master key inside of the payment device 250 (i.e., a key that can be regenerated symmetrically by the issuer 125). To create the payment device biometric key (PDBK) 320, a PAN of the payment device and the PSN can be added (as shown at flow 318) to the biometric master key (BMK) 316 (e.g., via existing processes for generating an ICC master key, for example as described in EMV standardization protocols and documentation (Smartcard Specifications—Book 2: Security and Key Management)).

Then, the biometric session key (BSK) 324 can be derived from the payment device biometric key (PDBK) 320 by applying the application transaction counter (ATC) count for the transaction (as shown at flow 322).

Once created, the biometric session key (BSK) can be used by the encryption algorithm (e.g., AES algorithm) to encrypt the transaction data to generate a biometric cryptogram. The biometric cryptogram, along with the redundant data (RD) 313 can be provided to the POS system 110, (e.g., as shown in flow (204) of FIG. 2A) for use by the issuer 125 during authorization.

As described above, once an issuer 125 receives an authorization request including a biometric cryptogram and before the issuer 125 can verify the cryptogram, the issuer 125 must first generate an issuer-generated biometric cryptogram, which can then be used to compare to the biometric cryptogram included in the authorization request.

FIG. 4 illustrates an example method for generating a biometric session key using a biometric master key at an issuer. Referring to FIG. 4, the process 400 can begin with biometric data (BD') 402 of a user. The process 400 can be performed at an issuer (e.g., issuer 125 described with respect to FIG. 2A).

In some cases, the user can provide biometric data (BD') 402 to the issuer via an application associated with the issuer executing on a computing device (e.g., mobile device, personal computer, etc.). In some cases, the user may provide biometric data to the issuer upon signing up for a biometrics payment card. Examples of biometric data (BD') 402 include, but are not limited to, fingerprint data, facial data, and iris data. A specific use case for generating a biometric session key at an issuer using fingerprint data is described with respect to FIG. 5B.

Process 400 can include extracting (404) features (F') from the biometric data (BD') 402. The features (F') can be extracted (404) by a suitable extraction method/algorithm based on the type of biometric data (e.g., fingerprint data, face scan data, etc.). The same extraction method/algorithm should be used in both process 300 performed by the payment device described with respect to FIG. 3 and process 400 performed by the issuer of that payment device.

Referring to FIG. 3 and FIG. 4, as discussed herein, the features (F') extracted at step (404) may be different from features (F) extracted at step (304) of process 300 described with respect to FIG. 3. This is because biometric data (BD)

302 and biometric data (BD') 402 may have slight variations and the feature extraction process may not yield identical results.

For example, if a first fingerprint scan of a user's right index finger is used to generate biometric data (BD) 302 and a second fingerprint scan of the same user's right index finger is used to generate biometric data (BD') 402, there can be slight differences in the data captured and, resultingly, differences in the features extracted. However, if the same biometric credential (e.g., right index finger) is used to generate the biometric data (BD) 302 and biometric data (BD') 402 features (F) and features (F'), the features (F') will be similar enough that, once the error correction code is applied, the resulting keys (K) will be the same.

The extracted features (F') can be converted (406) into a binary string (B'). Similarly, binary string (B') will be slightly different than binary string (B) of process 300.

Then, the binary string (B') can be converted (408) into gray code sequence (G'). Gray code sequence (G') will be slightly different than gray code sequence (G) created via process 400.

It should be noted that steps (404)-(408) can occur at any time prior to the transaction. As mentioned above, in some cases, the gray code sequence (G') can be stored by the issuer in addition to or in place of the biometric data associated with the payment card and the user. As such, when the issuer receives the authorization request including the biometric cryptogram, the issuer only needs to perform steps (410)-(414) to obtain the biometric master key (BMK) 416. The biometric master key 416 can be identical to the biometric master key 316 generated via process 300 with respect to FIG. 3.

During a transaction flow (e.g., 200 described with respect to FIG. 2A), the issuer can receive redundant data (RD) 313 along with the biometric cryptogram (e.g., in the authorization request). Then, using the redundant data (RD) 313, the same error correction code used in process 300 described with respect to FIG. 3 is used to correct gray code sequence (G') to obtain the key (K) 412. By applying the same error correction code, key (K) 412 is symmetrical to the key (K) 312 generated at the payment device 250 (e.g., via process 300 described with respect to FIG. 3) is generated at the issuer side.

The error correction code can be applied (410) on the gray code sequence (G') using the redundant data (RD) 313 to perform error correction to generate key (K) 412.

Notably, in some cases, when the biometric cryptogram was generated at the payment device using different biometric data, applying (410) the error correction code on the gray code sequence (G') using the redundant data (RD) will fail to generate key (K) 412. In this case, the issuer may stop the verification process here, because the issuer can determine that someone other than the user initiated the transaction using the payment device.

Once the key (K) 412 has been generated, process 400 can include applying (414) a hashing function to key (K) 412 to generate the biometric master key (BMK) 416. The same hashing function that is applied at step (314) of process 300 should be used in process 400 to obtain a biometric master key (BMK) 416 that is symmetrical key to biometric master key (BMK) 316. For example, the hashing function can be SHA-256 algorithm.

Then, the generated symmetrical biometric master key (BMK) 416 can be used by the issuer to regenerate a payment device biometric key (PDBK) 420 that is symmetrical to the payment device biometric key (PDBK) 320 of process 300 (e.g., using PAN/PSN data associated with the payment device stored by the issuer, as shown at flow (418)). Once the symmetrical payment device biometric key (PDBK) 420 is generated, a biometric session key (BSK) 424 that is symmetrical to the biometric session key (BSK) 324 can be derived using an ATC count (e.g., included in the transaction payload/authorization request, as shown at flow (422)).

The resulting symmetrical biometric session key (BSK) 424 can be used to generate an issuer-generated biometric cryptogram (e.g., using AES algorithm).

Figure 5A:
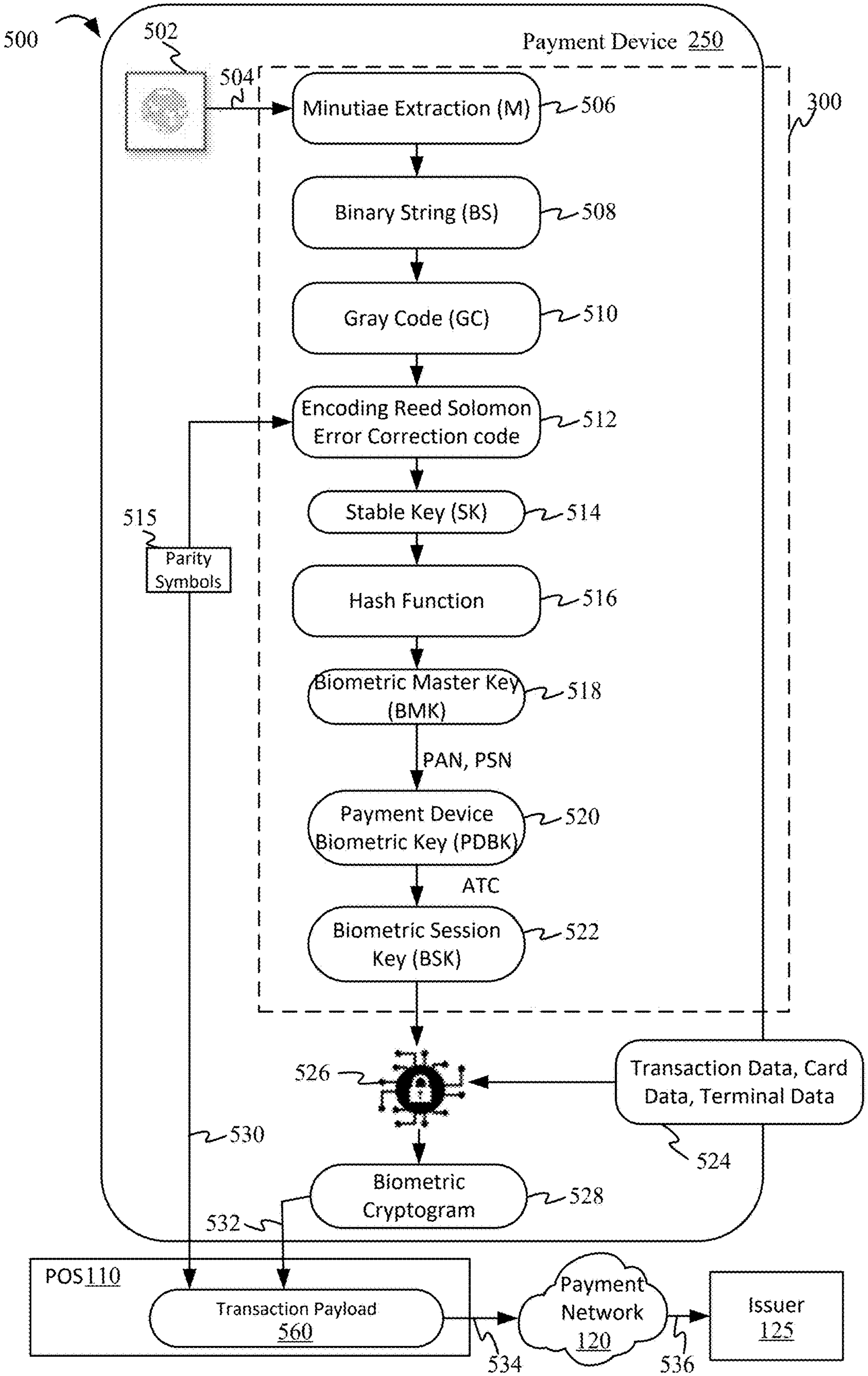
FIG. 5A-5B illustrates an example use case of a biometric cryptogram transaction process flow.
Figure 5B:
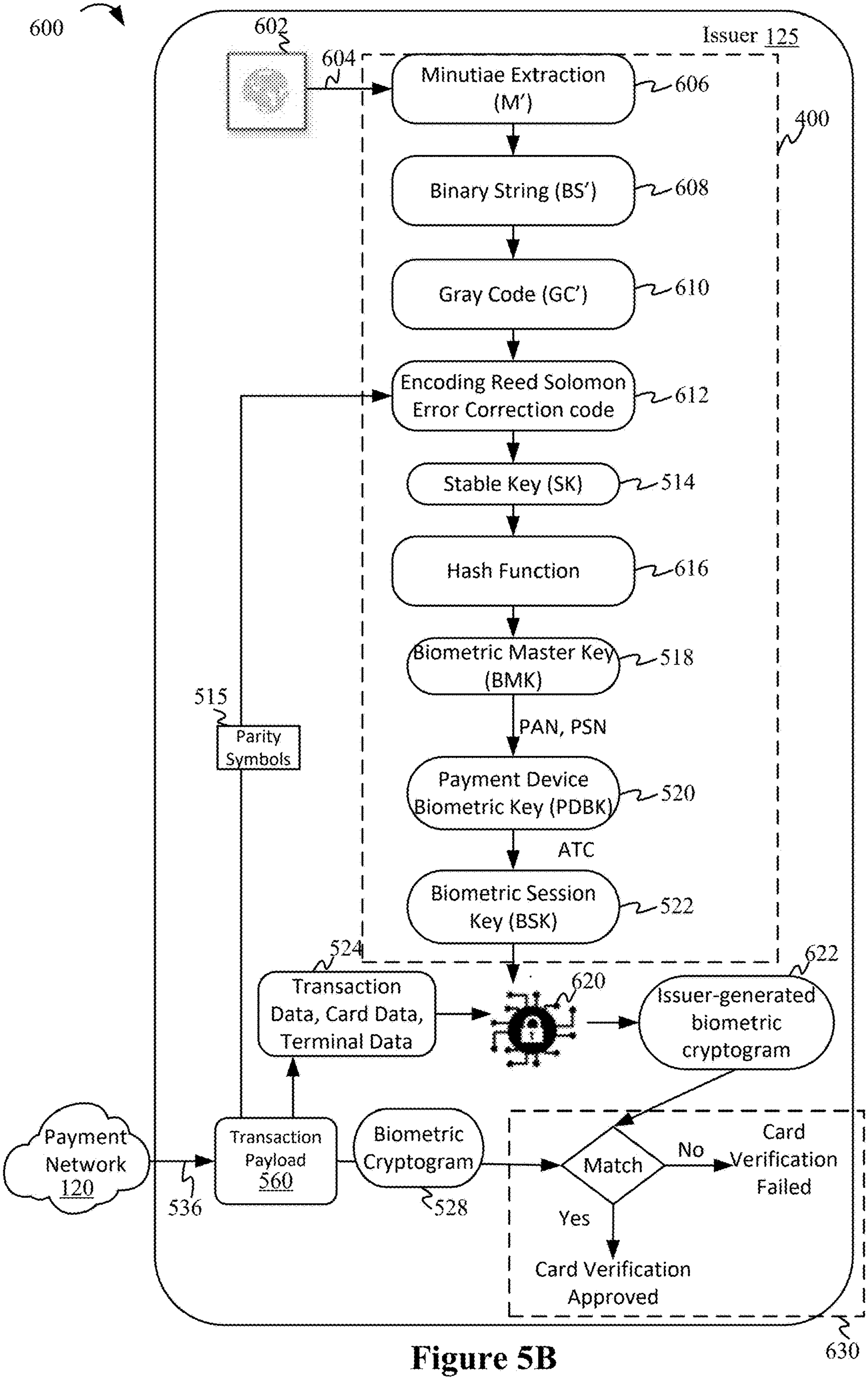

FIG. 5A-5B illustrates an example use case of a biometric cryptogram transaction process flow. Referring to FIG. 5A, process flow 500 includes an example use case of process 300 as described with respect to FIG. 3.

The process flow 500 can begin when the payment device 250 receives (504) fingerprint data 502 (e.g., a fingerprint image). The payment device 250 can perform (506) minutiae extraction to extract features (M) from the fingerprint data 502. The resulting features extracted from the fingerprint data (e.g., ridge ending and ridge bifurcation points) can be referred to as "minutiae points." The extracted features (M) can be converted into a sequence of integers.

Then, the payment device 250 can convert (508) the extracted features (M) (e.g., the sequence of integers) into a binary sequence, creating binary string (BS).

Then, the payment device 250 can convert (510) the binary string (BS) into a gray code sequence (GC). The obtained gray code sequence (GC) provides a stable key (SK) 514.

Then, the payment device 250 can use (512) Reed-Solomon code on the gray code sequence (GC) to generate parity symbols 515 (e.g., redundant data). Using (512) Reed-Solomon code, the exact cryptographic key that is generated at the payment device 250 for encryption at the payment device 250 can be generated again at the issuer side for encryption. In order for Reed-Solomon code to work, certain parity symbols 515 are created as part of the Reed-Solomon error correction algorithm. These parity symbols 515 are provided to the issuer 125 (e.g., the redundant data provided as part of the transaction payload 560) so that they are available during the generation of the issuer master key by the issuer 125.

Once the stable key (SK) 514 is created, the payment device 250 can apply (516) a SHA-256 hash function to the stable key (SK) 714 to convert the stable key (SK) 514 to a fixed length of 256 bits, creating a biometric master key (BMK) 518.

The biometric master key (BMK) 518 can act as the issuer master key inside of the payment device 250 (i.e., a key that can be regenerated symmetrically by the issuer 125). To create the payment device biometric key (PDBK) 520, a PAN of the payment device and the PSN can be added to the biometric master key (BMK) 518 (e.g., via existing processes for generating an ICC master key, for example as described in EMV standardization protocols and documentation (Smartcard Specifications—Book 2: Security and Key Management)).

Then, the biometric session key (BSK) 522 can be derived from the payment device biometric key (PDBK) 520 by applying the application transaction counter (ATC) count for the transaction (as shown at flow 322).

Once created, the biometric session key (BSK) 522 is used to encrypt (526) the transaction details 524 (e.g., transaction data, payment device/payment card data, and/or terminal data) using AES encryption to create a biometric cryptogram 528.

Then, the payment device 250 can provide (532) the biometric cryptogram 530 and provide (530) the parity symbols 515 to the POS system 110. The POS system 110 can include the biometric cryptogram 528 and the parity symbols 515 in the transaction payload 560 (e.g., in the payment request). The POS system 110 can provide the transaction payload 560 to the payment network 120 (e.g., via acquirer 115), as shown at step (534). The payment network 120 can send the transaction payload 560 to the issuer 125 (e.g., in an authorization request), as shown at step (536).

Referring to FIGS. 5A-5B, the process flow 600 can begin when an issuer 125 receives the transaction payload 560, as shown at step (536). The transaction payload 560 includes the biometric cryptogram 528 and the parity symbols 515. To verify the biometric cryptogram, the issuer 125 first must generate biometric session key (BSK) 522. Process flow 600 includes an example use case of process 400 as described with respect to FIG. 4.

The issuer 125 can obtain (604) fingerprint data 602 (e.g., a fingerprint image). The issuer 125 can perform (606) minutiae extraction to extract features (M') from the fingerprint data 602. In this case, the extracted features (M') are slightly different than the extracted features (M) as described with respect to FIG. 5A. The extracted features (M') can be converted into a sequence of integers.

Then, the issuer 125 can convert (608) the extracted features (M') (e.g., sequence of integers) into a binary sequence to produce binary string (BS').

Then, the issuer 125 can convert (610) the binary string (BS') into a gray code sequence (GC').

The gray code sequence (GC') generated using the fingerprint data 602 includes slight variations from the gray code sequence (GC) generated at step (510) in process flow 500. As such, where the gray code sequence (GC) is used as the stable key (SK), gray code sequence GC' would not create a symmetrical key to stable key (SK).

However, in order to validate the biometric cryptogram 528, the exact biometric session key (BSK) 522 that is generated at the payment device 250 needs to be re-generated again at the issuer 125 side to generate the issuer-generated biometric cryptogram. However, because the biometric data (e.g., fingerprint data 502) received (504) by the payment device 250 and the biometric data 602 stored by the issuer 125 may have slight variations, the biometric master keys generated based on the different biometric data would likely turn out to be different. However, if the biometric master keys are different, then the issuer will be unable to generate a matching issuer-generated biometric cryptogram.

Therefore, the issuer 125 can apply (612) Reed-Solomon code to the gray code sequence (GC') using the parity symbols 515 received in the transaction payload 560. Reed-Solomon code corrects the changed bits from the gray code sequence (GC') back to the encryption key, but only up to a certain number. Therefore, if the encryption key is done using biometric data 602 of the actual cardholder, then a very small number of bits needs to be corrected. However, when the encryption key is generated using an imposter's fingerprint data, there will be too much of a difference between the biometric master keys and the Reed-Solomon code will be unable to correct the number of bits needed to generate the symmetrical stable key (SK) 514.

Once the stable key (K) 514 is created by applying (612) Reed-Solomon code to the gray code sequence (GC'), the issuer 125 can apply (616) a SHA-256 hash function to the stable key (K) 514 to convert the stable key (SK) 514 to a fixed length, creating a biometric master key (BMK) 518.

The biometric master key (BMK) 518 can be used to create the payment device biometric key 520 by combining a PAN of the payment device and the PSN to the BMK 518 (e.g., via existing processes for generating an ICC master key, for example as described in EMV standardization protocols and documentation (Smartcard Specifications—Book 2: Security and Key Management)).

Then, the biometric session key 522 can be derived from the payment device biometric key 520 by applying the application transaction counter (ATC) count for the transaction.

The biometric session key (BSK) 522 can then be used to generate (620) issuer-generated biometric cryptogram 622 with the transaction details included in the transaction payload 560 using AES encryption.

Then, the issuer 125 can verify (630) the biometric cryptogram 528 by comparing it to the regenerated biometric cryptogram 622. In a case where the biometric cryptogram 528 matches the regenerated biometric cryptogram 622, the verification is successful. In a case where the biometric cryptogram 528 does not match the regenerated biometric cryptogram 622, the verification is unsuccessful.

Figure 6A:
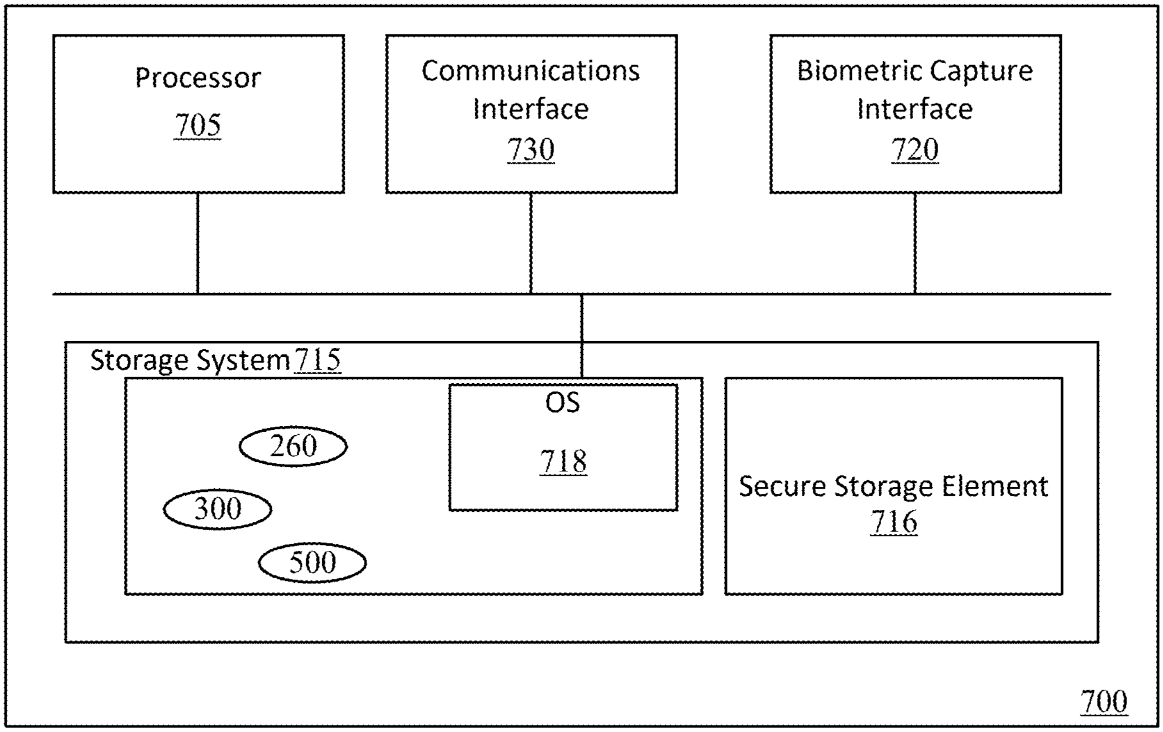
FIG. 6A illustrates components of a payment device that may be used in certain embodiments described herein.

FIG. 6A illustrates components of a payment device that may be used in certain embodiments described herein.

Referring to FIG. 6A, payment device 700 may include a designated payment instrument such as a payment card (e.g., smart card or chip card including EMV chip) or a computing device that supports payments (e.g., through a wallet, mobile application, or web application). Examples of payment device 700 include, but are not limited to, a biometric payment card, a mobile device, a personal computer, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to payment device 700 may be incorporated to implement a particular payment device. Payment device 700 includes a processing system 705 of one or more hardware processors to transform or manipulate data according to the instructions of software stored on a storage system 715. Processing system 705 can include a secure processor (e.g., for performing encryption) and a general processor. Examples of processors of the processing system 705 include general purpose central processing units, application specific processors, and logic devices, as well as any other type of processing device, combinations, or variations thereof. The processing system 705 may be, or is included in, a system-on-chip (SoC) along with one or more other components such as network connectivity components, memory, and sensors.

Storage system 715 may include volatile and nonvolatile memories, removable and non-removable media implemented in any method or technology for storage of information, such as computer readable instructions, data structures, program modules, or other data. The storage system 715 includes a secure storage element 716 (e.g., for storing cryptogram, a personal account number (PAN), a PAN sequence number (PSN), and other data and code) and general storage. Examples of storage media of storage system 715 include random access memory (e.g., DRAM, SRAM), read only memory (ROM), and flash. In no case is the storage medium a transitory propagated signal.

The storage system 715 can store an operating system 718, various software, and data. Software at the storage system 715 may be implemented in program instructions and among other functions may, when executed by payment device 700 (or by processor 705 in particular), direct payment device 700 to operate as described herein, including implementations of method 260, process 300, and process 500.

Biometric capture interface 720 may represent an interface for capturing biometric data, such as, but not limited to, a scanner (e.g., fingerprint scanner), sensor, or a camera device The payment device 700 can further include a communications interface 730. In some cases, the communications interface 730 includes a contact portion including input/output (I/O) port to support contact with pads at a POS system. Communications interface 730 may be configured for wireless communication. In some cases, communications interface 730 supports radio frequency communication, near field communication (NFC), Bluetooth®, etc.).

Figure 6B:
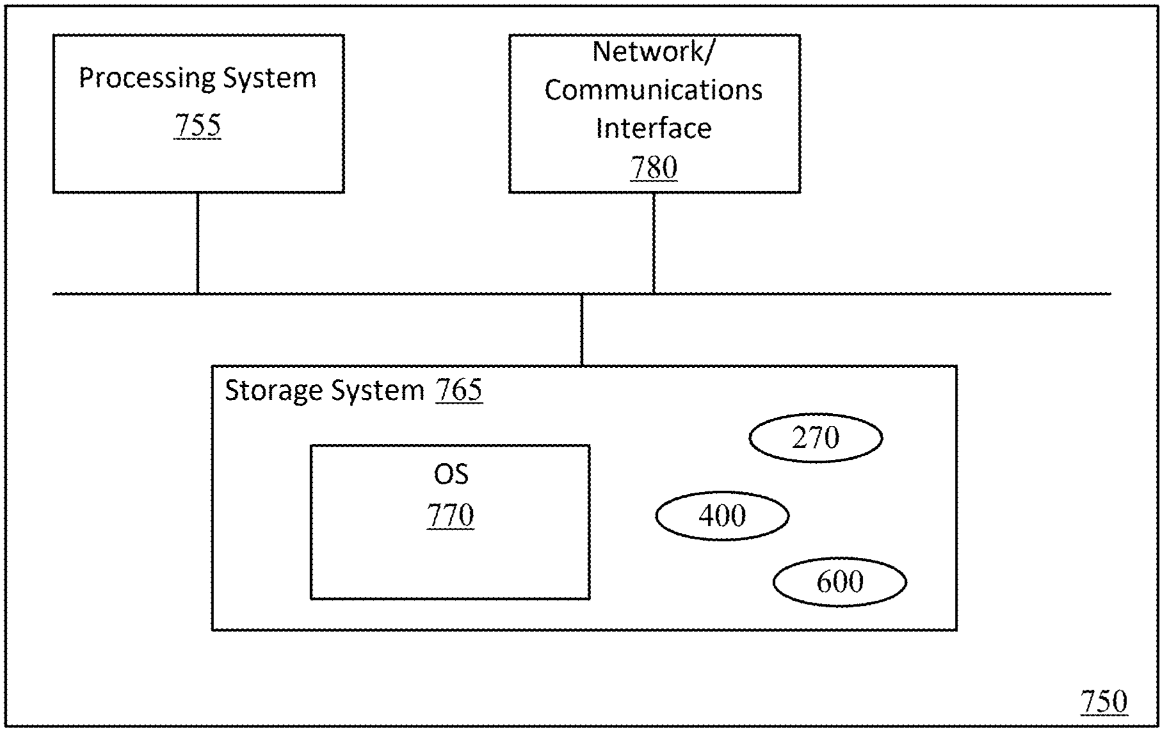
FIG. 6B illustrates components of a computing system that may be used in certain embodiments described herein.

FIG. 6B illustrates components of a computing system that may be used in certain embodiments described herein. Computing system 750 can embody computing systems of a merchant, acquirer, payment network, and issuer for implementing operations as described with respect to the merchant, acquirer, payment network, and issuer herein.

Referring to FIG. 6B, system 750 can include one or more blade server devices, personal computers, routers, hubs, switches, bridges, firewall devices, intrusion detection devices, mainframe computers, network-attached storage devices, and other types of computing devices. The system hardware can be configured according to any suitable computer.

The system 750 can include a processing system 755, which may include one or more processors and/or other circuitry that retrieves and executes software from the storage system 765.

The processing system 755 may be implemented within a single processing device but may also be distributed across multiple processing devices or sub-systems that cooperate in executing program instructions.

The storage system 765 can store an operating system 770 and software for executing various implementations of processes 400 and 600 and method 270 described herein.

Storage system 765 may include volatile and nonvolatile memories, removable and non-removable media implemented in any method or technology for storage of information, such as computer readable instructions, data structures, program modules, or other data. Examples of storage media of storage system 765 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory propagated signal.

Storage system 765 may be implemented as a single storage device but may also be implemented across multiple storage devices or sub-systems co-located or distributed relative to each other. Storage system 765 may include additional elements, such as a controller, capable of communicating with processing system 755. The storage system 765 may also include storage devices and/or sub-systems on which data is stored. System 750 may access one or more storage resources in order to access information to carry out any of the processes (e.g., process 400 and 600 and method 270) indicated by software.

Software at the storage system 765 may be implemented in program instructions and among other functions may, when executed by system 750 in general or processing system 755 in particular, direct system 750 or the one or more processors of processing system 755 to operate as described herein.

Network interface 780 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS 770, which informs applications of communications events when necessary.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A payment device, comprising:
a processing system;
a communications interface;
a storage system comprising a secure storage element; and
instructions stored in the storage system that, when executed by the processing system, direct the payment device to at least:
in response to receiving an indicator to initiate payment for a transaction,
generate a biometric cryptogram for the transaction, wherein the instructions to generate the biometric cryptogram direct the payment device to:
receive biometric data of a user;
generate a biometric master key using the biometric data;
generate a payment device biometric key using the biometric master key, a personal account number (PAN) of the payment device stored at the secure storage element of the payment device, and a PAN sequence number stored at the secure storage element of the payment device;
generate a biometric session key using the payment device biometric key and an application transaction counter (ATC) count; and
generate the biometric cryptogram for the transaction using the biometric session key; and
provide the biometric cryptogram for the transaction to a point-of-sale (POS) system for authorization of the transaction.

2. The payment device of claim 1, wherein the instructions to generate the biometric master key direct the payment device to:
extract features from the biometric data;
convert the extracted features into a binary string;
convert the binary string into a gray code sequence, wherein the gray code sequence forms a key;
generate redundant data using an error correction code on the key formed by the gray code sequence; and
apply a hashing function to the key formed by the gray code sequence to create the biometric master key.

3. The payment device of claim 2, wherein the instructions further direct the payment device to provide the redundant data to the POS system for the authorization of the transaction.

4. The payment device of claim 2, wherein the instructions to generate redundant data using the error correction code direct the payment device to generate parity symbols using a Reed-Solomon code on the key formed by the gray code sequence.

5. The payment device of claim 2, wherein the hashing function is a SHA-256 hash function.

6. The payment device of claim 2, wherein the biometric data is a fingerprint image, wherein the instructions to extract features from the biometric data direct the payment device to extract features from the fingerprint image using minutiae extraction.

7. The payment device of claim 1, further comprising a biometric capture interface, wherein the biometric data of the user is received via the biometric capture interface.

8. The payment device of claim 7, wherein the payment device is a biometric payment card.

9. The payment device of claim 1, wherein the biometric master key is generated using a symmetric-key algorithm.

10. A method, comprising:
- receiving an authorization request for a transaction, wherein the authorization request comprises a biometric cryptogram associated with an account of a user and an application transaction counter (ATC) count generated by a payment device of the user;
- obtaining a biometric master key generated using biometric data of the user;
- generating a payment device biometric key using the biometric master key, a personal account number (PAN) of the account of the user, and a PAN sequence number (PSN);
- generating a biometric session key using the payment device biometric key and the ATC count received in the authorization request;
- generating an issuer-generated biometric cryptogram using the biometric session key;
- verifying the biometric cryptogram using the issuer-generated biometric cryptogram; and
- sending an authorization signal for the transaction in response to verifying the biometric cryptogram.

11. The method of claim 10, wherein verifying the biometric cryptogram using the issuer-generated biometric cryptogram comprises comparing the biometric cryptogram to the issuer-generated biometric cryptogram.

12. The method of claim 10, wherein the authorization request comprises redundant data associated with the biometric cryptogram, and wherein obtaining the biometric master key comprises:
- generating the biometric master key, wherein generating the biometric master key comprises:
  - extracting features from the biometric data of the user;
  - converting the extracted features into a binary string;
  - converting the binary string into a gray code sequence;
  - applying error correction to the gray code sequence using the redundant data to generate a key; and
  - applying a hashing function to the key to create the biometric master key.

13. The method of claim 12, wherein the redundant data comprises parity symbols, wherein applying error correction to the gray code sequence comprises applying Reed-Solomon error correction to the gray code sequence using the parity symbols.

14. The method of claim 12, wherein the biometric data of the user is a stored fingerprint image.

15. The method of claim 10, wherein the authorization request comprises redundant data associated with the biometric cryptogram, wherein the biometric data of the user is a stored gray code sequence generated by extracting features from the biometric data of the user, converting the extracted features into a binary string, and converting the binary string into the gray code sequence, and wherein obtaining the biometric master key comprises:
- generating the biometric master key by:
  - applying error correction to the stored gray code sequence using the redundant data to generate a key; and
  - applying a hashing function to the key to create the biometric master key.

16. A computer readable storage medium having instructions stored thereon that when executed by a processing system, direct the processing system to at least:
- receive an indicator to initiate payment for a transaction;
- in response to receiving the indicator, generate a biometric cryptogram for the transaction, wherein the instructions to generate the biometric cryptogram for the transaction direct the processing system to:
  - receive biometric data of a user;
  - generate a biometric master key using the biometric data;
  - generate a payment device biometric key using the biometric master key, a personal account number (PAN) of the payment device stored at a secure storage element of the payment device, and a PAN sequence number stored at a secure storage element of the payment device;
  - generate a biometric session key using the payment device biometric key and an application transaction counter (ATC) count; and
  - generate the biometric cryptogram for the transaction using the biometric session key; and
- provide the biometric cryptogram for the transaction to a point-of-sale (POS) system for authorization of the transaction.

17. The computer readable storage medium of claim 16, wherein the instructions to generate the biometric master key further direct the computing system to:
- extract features from the biometric data;
- convert the extracted features into a binary string;
- convert the binary string into a gray code sequence, wherein the gray code sequence is a key;
- generate redundant data using an error correction code on the gray code sequence; and
- apply a hashing function to the key to create the biometric master key.

18. The computer readable storage medium of claim 17, wherein the instructions further direct the computing system to: provide the redundant data to the POS system.

19. The computer readable storage medium of claim 16, wherein the biometric data is a fingerprint image, and wherein the instructions to generate the biometric master key direct the computing system to:
- extract features from the fingerprint image using Minutiae Extraction;
- convert the extracted features into a binary string;
- convert the binary string into a gray code sequence, wherein the gray code sequence is a stable key;
- generate parity symbols using Reed-Solomon code on the gray code sequence; and apply a SHA-256 hash function to the stable key to create the biometric master key.

20. The computer readable storage medium of claim 19, wherein the instructions further direct the computing system to: provide the parity symbols to the POS system.

* * * * *